(12) United States Patent
Thompson et al.

(10) Patent No.: US 7,114,158 B1
(45) Date of Patent: Sep. 26, 2006

(54) PROGRAMMING FRAMEWORK INCLUDING QUEUEING NETWORK

(75) Inventors: Donald Thompson, Mercer Island, WA (US); Alan S. Geller, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 607 days.

(21) Appl. No.: 09/968,672

(22) Filed: Oct. 1, 2001

(51) Int. Cl.
*G06F 9/46* (2006.01)
*G06F 15/16* (2006.01)
*G06F 7/00* (2006.01)

(52) U.S. Cl. ............... 718/106; 709/206; 709/223; 719/317; 719/327; 707/1

(58) Field of Classification Search ........ 718/100–108; 709/206, 223; 719/317, 327; 707/1
See application file for complete search history.

(56) References Cited

U.S. PATENT DOCUMENTS

| | | | |
|---|---|---|---|
| 5,367,681 A * | 11/1994 | Foss et al. ................. 719/314 |
| 5,535,322 A * | 7/1996 | Hecht ............................ 705/1 |
| 5,594,889 A * | 1/1997 | Colgate et al. ............. 711/171 |
| 5,815,793 A | 9/1998 | Ferguson | |
| 5,844,980 A * | 12/1998 | Patel et al. ............. 379/88.22 |
| 6,058,389 A * | 5/2000 | Chandra et al. ............... 707/1 |
| 6,134,594 A | 10/2000 | Helland et al. | |
| 6,202,089 B1 | 3/2001 | Juster | |
| 6,363,363 B1 | 3/2002 | Haller et al. | |
| 6,479,794 B1 | 11/2002 | Sykes et al. | |
| 6,549,773 B1 | 4/2003 | Linden et al. | |
| 6,591,277 B1 | 7/2003 | Spence et al. | |
| 6,771,660 B1 | 8/2004 | Bourlas et al. | |
| 6,836,888 B1* | 12/2004 | Basu et al. ................. 718/104 |
| 6,850,490 B1* | 2/2005 | Woo et al. .................. 370/230 |
| 7,003,781 B1* | 2/2006 | Blackwell et al. .......... 719/327 |
| 7,010,586 B1* | 3/2006 | Allavarpu et al. .......... 709/223 |
| 2001/0005853 A1* | 6/2001 | Parkes et al. ............... 709/106 |
| 2002/0065947 A1* | 5/2002 | Wishoff et al. ............. 709/317 |
| 2002/0087613 A1* | 7/2002 | Harif ............................ 709/104 |
| 2003/0028580 A1* | 2/2003 | Kucherawy ................. 709/101 |
| 2003/0050983 A1* | 3/2003 | Johnson ...................... 709/206 |

OTHER PUBLICATIONS

Snoeren et al., "Mesh-Based Content Routing Using XML", ACM, 2001, pp. 160-173.*
Amir et al., "An Active Service Framework and its Application to Real-Time Multimedia Transcoding", ACM, 1998, pp. 178-189.*
Microsoft Corporation, "Architectural Design: A Scalable, Highly Available Business Object Architecture," Windows 2000 White Paper, 2000, pp. 1-14, USA.
Microsoft Corporation, "Microsoft Message Queuing Services," Microsoft Message Queue Server Reviewer's Guide, 1997, pp. 1-38, USA.
Microsoft Corporation, "Message Queuing in Windows XP: New Features," MSMQ3.0 for Windows XP White Paper, 2000, pp. 1-12, USA.

(Continued)

*Primary Examiner*—Meng-Al T. An
*Assistant Examiner*—Jennifer N. To
(74) *Attorney, Agent, or Firm*—Senniger Powers

(57) ABSTRACT

A queueing network framework for processing messages in stages in a multi-processor environment. An event source generates work packets that have information relating to the messages to be processed. The work packets are queued before processing by a plurality of application services. Each application service follows a queue and defines a processing stage. At each processing stage, the application service operates on a batch of the work packets queued for it by the respective queue.

32 Claims, 5 Drawing Sheets

OTHER PUBLICATIONS

Parkes, et al., "A Library-based Approach to Portable, Parallel, Object-Oriented Programming: Interface, Implementation, and Application," Conference on High Performance Networking and Computing, Nov. 1994, pp. 69-78, USA.

Brewer, et al., "Remote Queues: Exposing Message Queues for Optimization and Atomocity," ACM Symposium on Parallel Algorithms and Architectures, Jun. 1995, pp. 42-53, USA.

Schwan, et al., "Topologies'-Distributed Objects on Multicomputers," ACM Transactions on Computer Systems, vol. 8, Issue 2, May 1990, pp. 111-157, USA.

Agha, Gul, "Concurrent Object-Oriented Programming," Communications of the ACM, vol. 33, No. 9, Sep. 1990, pp. 125-141, USA.

Tyson, et al., "Techniques for Extracting Instruction Level Parallelism on MIMD Architectures," Proceedings of the 26th Annual International Symposium on Microarchitecture, Dec. 1993, pp. 128-137, USA.

Fillo, et al., "The M-Machine Multicomputer," Proceedings of the 28th Annual International Symposium on Microarchitecture, Nov. 1995, pp. 146-156, USA.

Maples, Creve, "A High-Performance, Memory-Based Interconnection System for Multicomputer Environments," Proceedings on Supercomputing, 1990, pp. 295-304, USA.

Schwan, et al., "Topologies'—Computational Messaging for Multicomputers," Proceedings of the Third Conference on Hypercube Concurrent Computers and Applications, 1988, pp. 580-593, USA.

* cited by examiner

PROGRAMMING FRAMEWORK INCLUDING QUEUEING NETWORK

TECHNICAL FIELD

The invention relates generally to a runtime environment and programming framework for building server applications and, particularly, to such a framework using a queueing network in a multi-processor environment to build scalable, dynamic, and extensible server applications without the need for re-compiling.

BACKGROUND OF THE INVENTION

Conventional server applications follow a paradigm of request, process, and then respond. In a multi-processor environment, server applications attempt to create enough worker threads to keep all processors executing application code at all times. An example of a typical server application is a database query. After the client makes its query against the database, the server loads and scans index pages, loads and scans data pages, builds up a result set, and so forth. Server applications typically process a client request from start to finish so the server tends to reach points where contentions for a global resource or an input/output operation block further processing. In other words, "thrashing" of the global state (data structures, cache memory, etc.) occurs at the expense of the local state (the request). The processor caches become overwhelmed by constantly fetching new code and/or data from either RAM or disk. Moreover, context switching occurs, which causes programming threads to interfere with one another as the data needed by the new thread overwrites the data being used by a previous thread.

As another example, consider a server application tracking the number of string and character occurrences that it has been given. In this example, the application has two primary functions, namely, ADD and DUMP. The ADD function accepts an arbitrary string and performs a reference count on the string and the characters making up the string. The DUMP function returns an extensible markup language ("XML") file containing all of the strings and characters and their reference counts.

According to the prior art, the server application in this instance includes the steps of parsing the inbound request; deciding on the required action; performing the ADD; and performing the DUMP. The ADD function includes performing a lookup of the string in a hash table and, if it is not found, creating a record, preparing the record, and then inserting the record in the table. The ADD function then increments the reference count and iterates across the characters in the string, incrementing the reference counts in a table (e.g., a 255-byte double word array indexed by character). The DUMP function iterates across the hash table to generate the string XML and iterates across the letters table to generate the character XML.

In this example, processing of the string table, the character table, and the system heap for the hash records and outbound XML may cause contentions. For instance, if the hash table is not locked before lookups are performed, one thread may attempt to perform an insertion while another is performing a lookup. A conventional server application such as this one spends an undesirable amount of time serializing access to the shared data structures and context switching among all of the request threads. Moreover, writes on different processors continually invalidate cache lines and running under well known Web server software causes thrashing of the instruction cache.

These problems are particularly apparent with enterprise-class server applications involving multiple processors. Those skilled in the art recognize that enterprise-class server applications tend to dominate the machines on which they run and, thus, function like single-function appliances. This is true for database servers, web servers, mail servers, search engines, ad servers, and the like.

For these reasons, a framework for server applications is desired for increasing the number of simultaneous requests that can be handled, maximizing throughput while minimizing latency thus reducing contentions and improving cache coherency. Such a framework is further desired for optimizing the global state of the machine at the expense of the local state of the request.

SUMMARY OF THE INVENTION

The invention meets the above needs and overcomes the deficiencies of the prior art by providing a runtime environment and programming framework for building server applications. According to one aspect of the invention, such a framework increases the number of simultaneous requests that can be handled. In turn, the application built on this framework maximizes throughput while minimizing latency thus reducing contentions and improving cache coherency. Such a framework further optimizes the global state of the machine. Advantageously, the present invention provides scalable, dynamic, and extensible server applications that can be easily added to without re-compiling. Moreover, the invention as described herein is economically feasible and commercially practical.

Briefly described, a queueing network embodying aspects of the invention processes messages in stages. The network includes an event source for generating work packets that have information relating to the messages to be processed. A plurality of inbound queues queue the work packets before processing by a plurality of application services. Each application service follows one of the inbound queues and defines a processing stage. At each processing stage, the application service executes a single operation on a batch of the work packets queued for it by the respective inbound queue.

Another embodiment of the invention is directed to a method of processing messages in a distributed processing system. The method includes generating one or more work packets and defining a plurality of processing stages. In this embodiment, each of the work packets holds information relating to one of the messages to be processed. The method also includes defining a plurality of processing stages and queueing the work packets before each of the processing stages. Each of the processing stages includes an application service for executing on the work packets and the method finally includes executing each of the application services on a batch of the work packets queued for the respective processing stage.

In another embodiment, one or more computer-readable media have computer-executable instructions for performing the method of the invention.

In yet another form, one or more computer-readable media have computer-executable components for processing messages in stages. The computer-readable media include an event source component, a plurality of inbound queue components, and a plurality of application service components. The event source component generates work packets including information relating to one of the messages to be processed. The inbound queue components queue the work packets before processing by the application service components. Each application service component follows one of the inbound queue components and defines a processing stage. At each processing stage, the application service component executes a single operation on a batch of the work packets queued for it by the respective inbound queue component.

Another method embodying aspects of the invention develops server applications for use in a multi-processor environment. The method includes defining a plurality of processing stages for processing requests. Each processing stage includes a dedicated application service, which has a single thread of execution. The method also includes generating one or more work packets and providing queues before each of the processing stages for queueing the work packets. Each work packet has information relating to one of the requests to be processed. Also, each application service is executed on a batch of the work packets queued for the respective processing stage. The method further includes routing the work packets through the processing stages until the requests are satisfied.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

The present invention relates to a runtime environment and programming framework using a queueing network for building server applications. Referred to herein as a general queueing network framework ("GQNF"), the framework permits developers to build scalable, dynamic, and extensible server applications without the need for re-compiling. As described in detail below, the framework consists of several collaborating components: a queueing network kernel, node managers, nodes, and network elements (e.g., queues, event sources, event sinks, and application services). Through the use of queues, processing occurs in stages in which the application services execute batches of requests in parallel to perform the actual work of the server. Processing in stages optimizes the global state of the machine at the expense of the local state of the request. This significantly reduces the risk of contentions and improves cache operation, which in turn leads to greater throughput.

In general, a queueing network operates according to the following:
 (a) An event occurs and an event source generates a work packet;
 (b) The event source places the work packet on a network of queues and application services;
 (c) Application services process the work packet; and
 (d) The services route the work packet through the network until it arrives at an event sink, where it is terminated.

In one embodiment, the GCNF is implemented as a data-driven network-based service having a "program-by-interface" model, which makes substantially all of the objects replaceable (e.g., queue primitives and event sources). The program-by-interface model, also referred to as a "programming by contract" model, establishes a contract between caller and callee such that any implementation satisfying the terms of the contract can be used without impacting the caller. The invention permits dynamic reconfiguration of a server application including adding, deleting, and combining processing stages.

Figure 1:
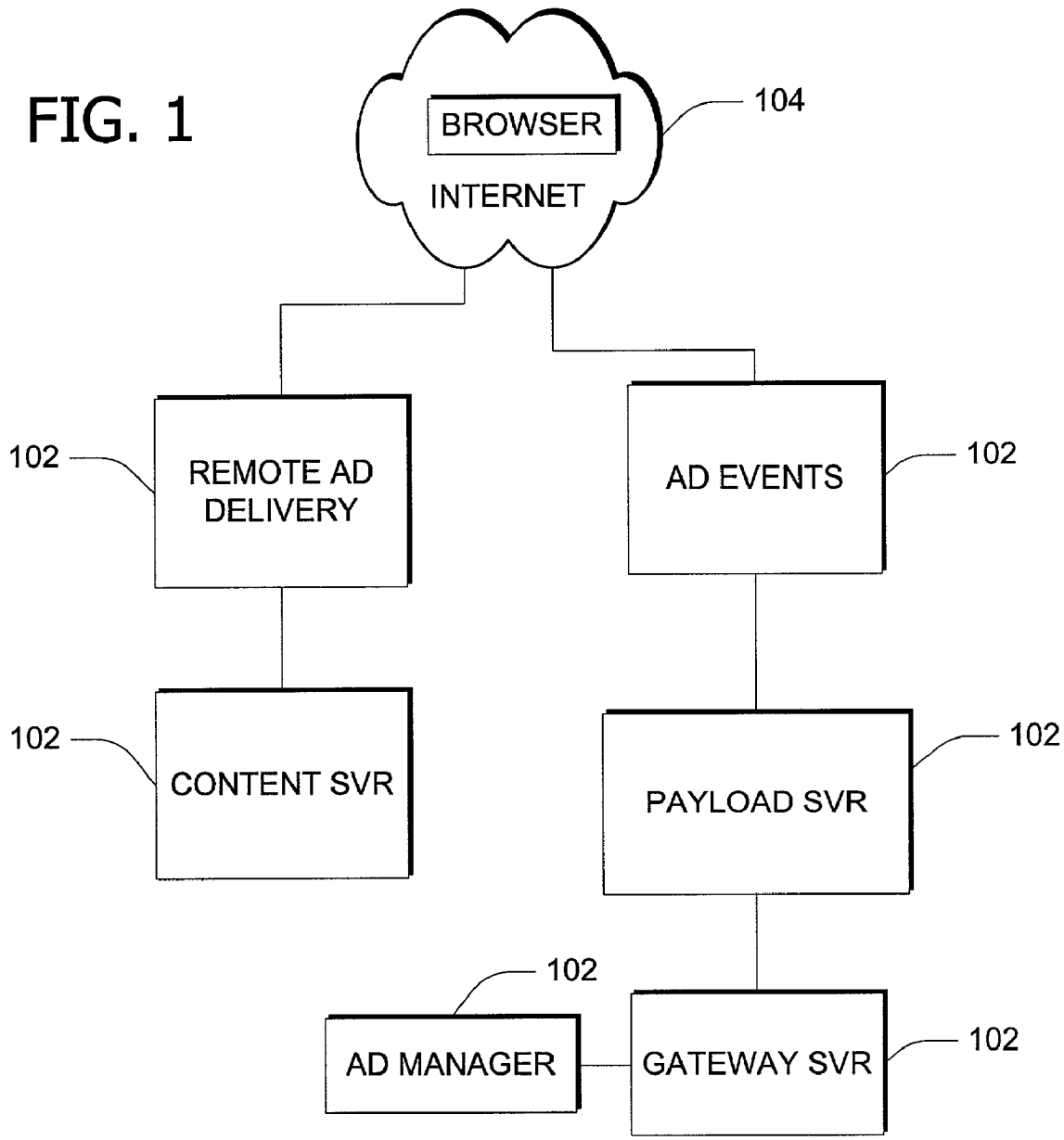
FIG. 1 is a block diagram illustrating an exemplary network environment in which one embodiment of the present invention is utilized.

FIG. 1 illustrates an exemplary network environment in which the present invention is utilized. For example, the GQNF enables the rapid development of high performance, dynamic enterprise applications for use in a multi-processor environment, such as a distributed advertisement and content rendering engine and centralized monitoring and configuration system. Those skilled in the art are familiar with such multi-processor systems. Therefore, many aspects of the ad system of FIG. 1 are omitted for simplicity. It is to be understood, however, that such a system generally includes a plurality of server computers 102 coupled to a data communication network 104. In this example, the network 104 is the Internet (or the World Wide Web). However, the teachings of the present invention can be applied to any data communication network. The servers 102, also referred to as "Web servers" and "network servers," are capable of interacting with Web browsers and other Web servers. In this example, servers 102 communicate data between each other using the hypertext transfer protocol (HTTP), a protocol commonly used on the Internet to exchange information. In an alternative embodiment, servers 104 communicate via a proprietary binary protocol (e.g., general communications framework protocol ("GCFP")).

The servers 102 include, for example, an ad delivery system for rotating advertisements and a content server providing the site content. In general, the ad delivery system includes a set of software components, Web servers, and SQL databases and executes the components that rotate ads, log usage data, and redirect users to advertiser Web sites. An "ad manager" data entry system provides a set of data entry tools, file servers, and databases for entering and editing ad orders and tracking inventory. The "ad events" component is responsible for recording "events" that arise as a result of a user being shown an ad, such as "clicking" on the ad. The "payload server" is a constraint matching engine and is the basis for the ad server. It is responsible for accepting a request from a Web site that wishes to display ads and it picks the best ad for the request according to rules established by advertiser. The "gateway server" is an extension to the payload server that allows "clusters" of servers to be formed for scaling out. In one embodiment, payload servers share various synchronized counters, and the gateway server is a payload server that is used to synchronize these counters through a tree-like communications topology. Although described in connection with an ad system, it is to be understood that the present invention is suited for developing server applications for use in any multiprocessor system.

Figure 2:
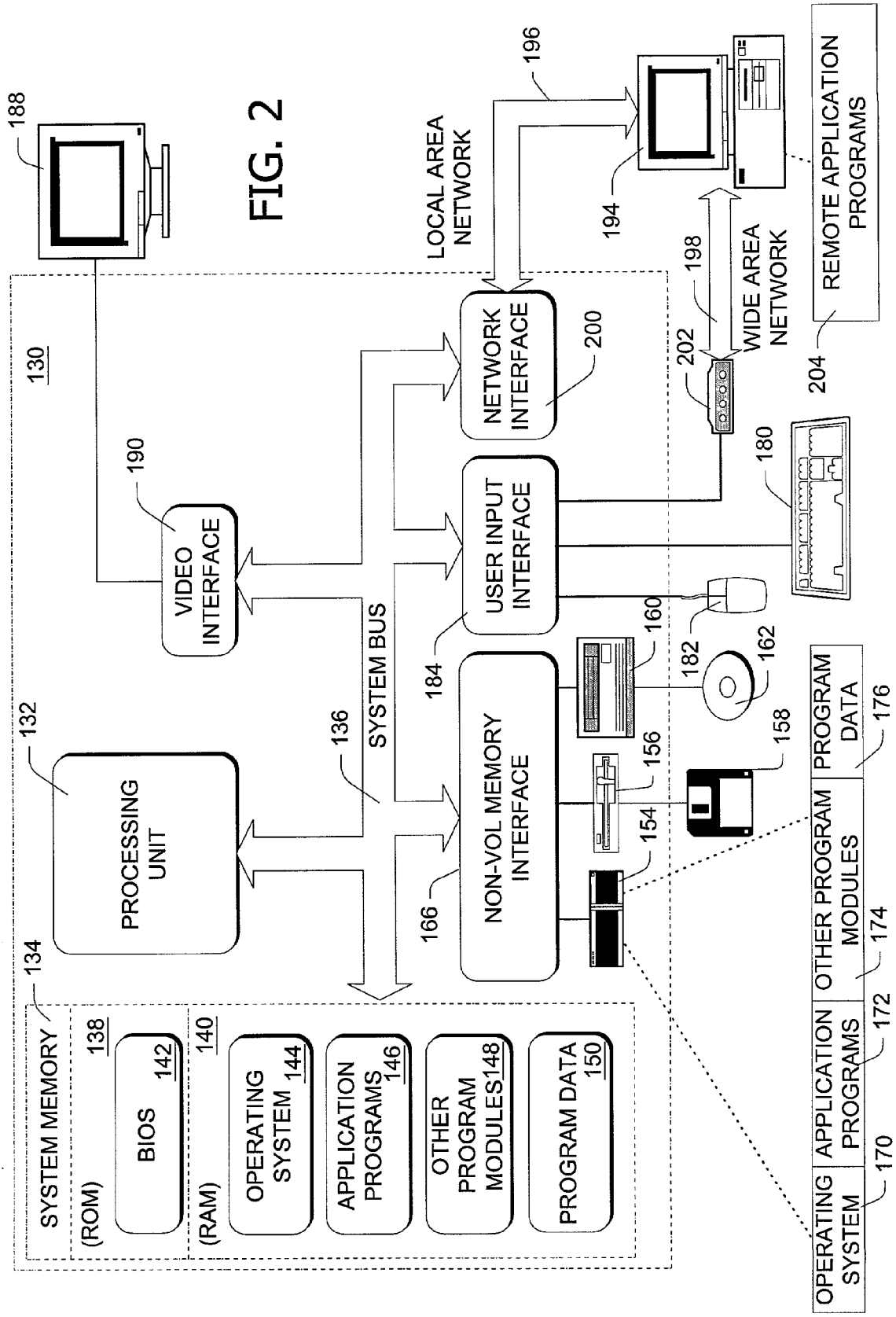
FIG. 2 is a block diagram illustrating components of a computer for use in the environment of FIG. 1.

FIG. 2 shows one example of a general purpose computing device in the form of a computer 130. In one embodiment of the invention, a computer such as the computer 130 is suitable for use as any of the servers 102.

In the illustrated embodiment, computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during startup, is typically stored in ROM 138. RAM 140 typically contains data and/or program modules that are immediately accessible to and/or presently being operated on by processing unit 132. By way of example, and not limitation, FIG. 2 illustrates operating system 144, application programs 146, other program modules 148, and program data 150.

The computer 130 may also include other removable/non-removable, volatile/nonvolatile computer storage media For example, FIG. 1 illustrates a hard disk drive 154 that reads from or writes to non-removable, nonvolatile magnetic media. FIG. 1 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media, Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 2, provide storage of computer readable instructions, data structures, program modules and other data for the computer 130. In FIG. 2, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a universal serial bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 2 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 1 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components, such as the operating system, are illustrated herein as discrete blocks. It is recognized, however, that such programs and components reside at various times in different storage components of the computer, and are executed by the data processor(s) of the computer.

As described above, multi-processor systems often suffer from undesirable contentions that interfere with optimum processing of requests. Asynchronous models allow a service consumer to perform other activities while waiting for a service provider to do the requested work. This provides for maximum use of computational resources. Therefore, such asynchronous models are generally preferable to synchronous models. A data structure such as a queue allows a service provider to be busy fulfilling requests when new requests come in without losing the request or blocking the requester. By analogy, if telephoning someone who is not home, a caller can simply let the telephone ring until answered. This is essentially a blocking operation because it prevents the caller from making use of his or her time while waiting. On the other hand, the caller can queue a message on an answering machine and then continue with other tasks while waiting for a return call.

Conventional server architecture tends to process a request from start to finish, taking the request through all of the various stages. In contrast, the present invention involves writing server applications that break the discrete actions into dedicated services and allow each service to perform the same action on a batch of requests uninterrupted on a processor. Even if the average amount of time increases for processing a single request (as it must pass from one service to the next), the overall processing time decreases because the multiple processors are kept busy and are able to process a greater number of requests. Cache coherency is increased because the code and data (with good spatial locality) are much less likely to become invalidated or blocked. The result is that fewer physical servers can service more requests, thereby reducing equipment cost and operational overhead.

The invention achieves these beneficial results through the use of data structures such as queues. In particular, server applications built on the framework of the present invention generate requests and pass them from service to service via queues until the requests have been satisfied.

Figure 3:
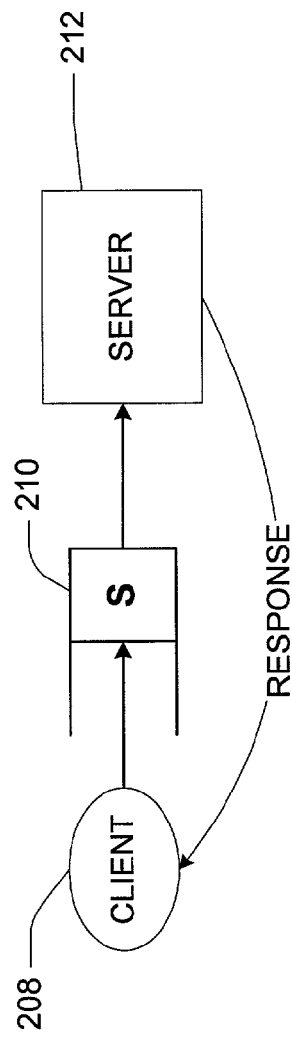
FIGS. 3 and 4 are exemplary flow diagrams illustrating the interaction between a client and a server in a queueing network according to one embodiment of the invention.

FIG. 3 shows a queued system interaction to illustrate this concept. In FIG. 3, a client 208 enqueues a request on a simple queue 210. When a server 212, such as one of the servers 102, is ready, it will process the request (i.e., dequeue the request in first-in, first-out ("FIFO") order). After processing, the server 212 sends a response back to the client 208.

Servers can be implemented using a dynamic and extensible framework (i.e., GQNF) that will manage all of the queueing details. According to the invention, a request passes through a set of queues that connect services. Rather than requiring a static configuration and tight coupling between services, the GQNF model allows for the dynamic reconfiguration of services and the ability to add new ones, on the fly, without a system re-compilation. Additionally, GQNF isolates services from the details of the environment in which they are operating because each service performs a single duty. Service isolation in this manner simplifies development and testing due to a resultant narrow scope.

Figure 4:
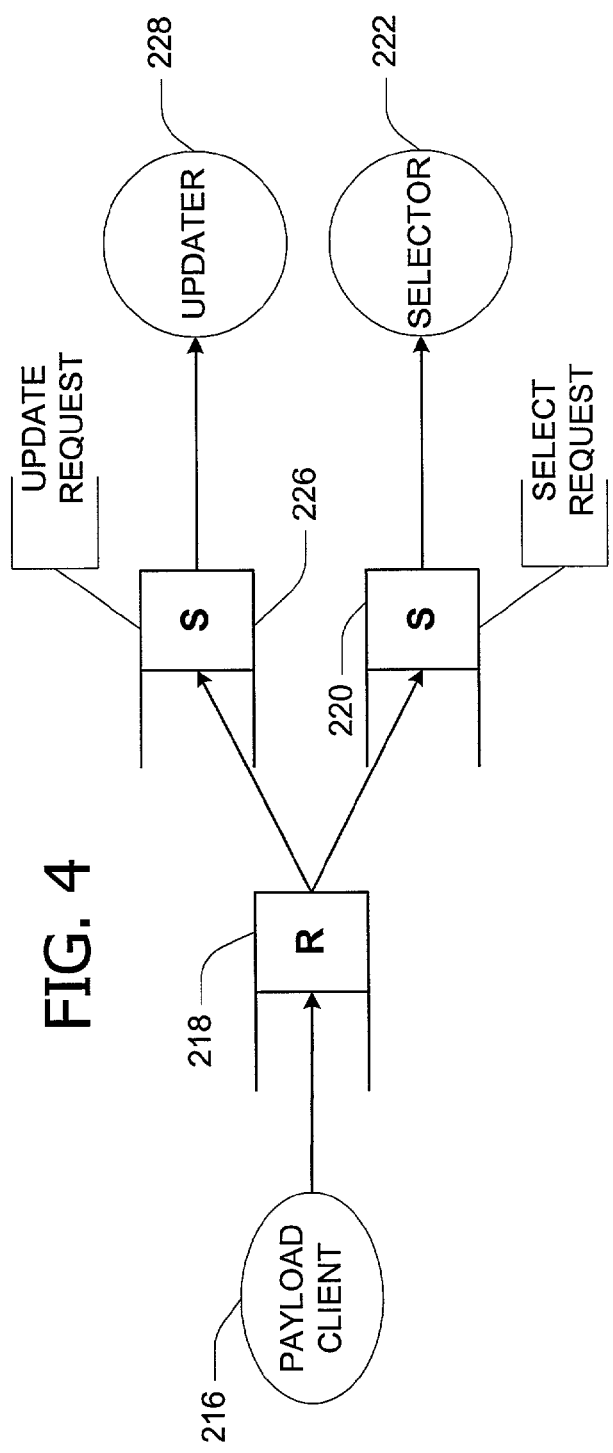

FIG. 4 expands on the simple system of FIG. 2 to illustrate a general queueing framework according to the invention. In general, a queueing network of the type described herein generates a work packet when an event occurs. The work packet, which is the object representing the request state, travels on the network of queues and application services. The application services process the work packet, which is routed through the network until it arrives at an event sink where the work packet is terminated. In FIG. 4, a payload client 216 first generates a request and passes the request to a routing queue 218. The routing queue 218 is essentially a facade in that it does not implement a queue but actually holds references to real queues. Routing queue 218 is configured to associate a request attribute with a set of queues on the basis of the attribute's value. In other words, routing queue 218 will dispatch the request to the appropriate queue. In this example, the payload client 216 submits two types of requests to a payload server for manipulating payloads: SELECT and UPDATE. If the request type attribute indicates a SELECT, routing queue 218 passes the request through a queue 220 to an application service 222 for selecting a payload based on the set of query parameters contained within the request. On the other hand, if the request type attribute indicates an UPDATE, routing queue 218 passes the request through a queue 226 to an application service 228 for updating a payload with information contained within the request (payload specific). In either instance, each application service performs a single operation or set of operations on a batch of requests.

As described above, the prior art approach optimizes the local state of the request at the expense of the global state of the machine. Advantageously, the present invention optimizes the global state of the machine at the expense of the local state of the request. After decomposing the application into discrete processing "stages," the application is restructured to process requests at a particular stage in batches. This essentially involves placing queues between each stage and executing a single thread per processor. In turn, the processor executes one stage of the application on a batch of requests ready at that stage according to some algorithm, such as round robin.

As implemented by the GQNF, the multi-processor/single thread programming model allows data access patterns to be optimized thereby reducing contention. Moreover, data and instruction caches stay active because the processors execute code in loops performing the same action with the same data. An important benefit of this approach is that application services execute a batch of requests in parallel, providing an overall increase in throughput.

An important aspect of the invention involves the use of dedicated processors. In one embodiment, each application service executes on a dedicated central processing unit ("CPU"). In some instances, a small number of application services may share a CPU, or there may be multiple CPUs executing the same logical application service, taking requests off of the same input queue and placing the completed packets on the same output queue.

Figure 5:
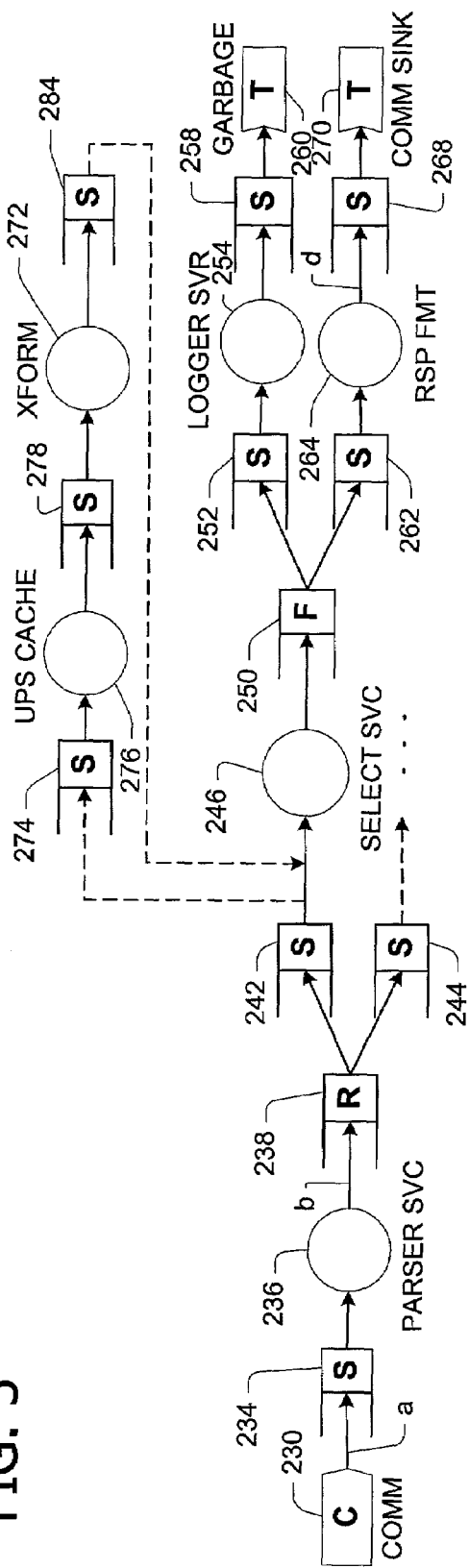
FIG. 5 is an exemplary flow diagram of a server application built on a queuing network framework according to one embodiment of the invention.
Figure 6:
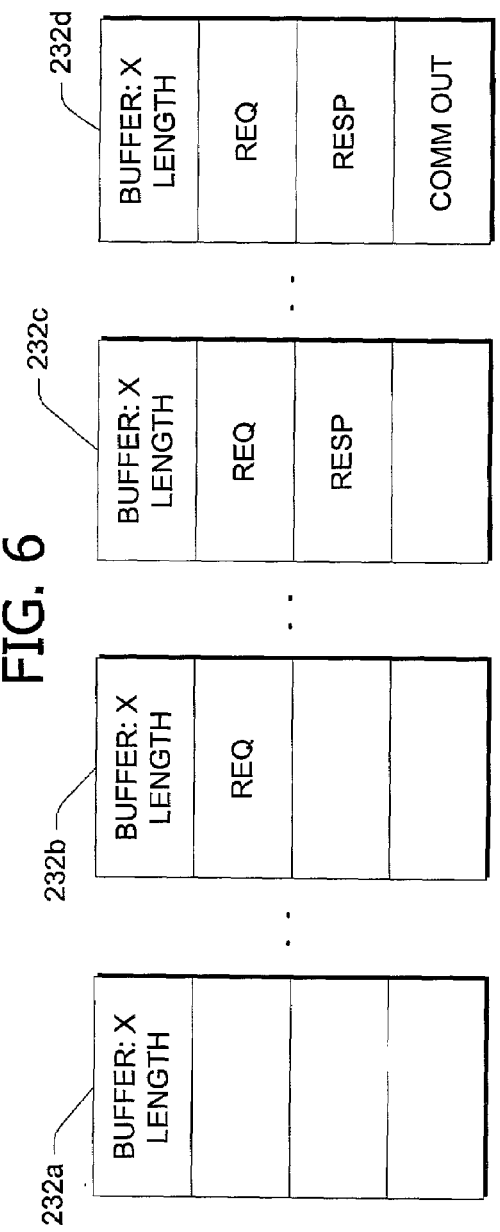
FIG. 6 are block diagrams illustrating exemplary work packets generated during processing of the server application of FIG. 5.

Referring now to FIG. 5, another exemplary implementation illustrates further aspects of the general queueing network according to the invention. Beginning at a communications source 230, the network listens for incoming requests and generates work packets including information relating to the requests. In this example, the COMM 230 demultiplexes each one of the messages in a buffer to generate a work packet 232 (see FIG. 6). In FIG. 6, the first field of the work packet 232 shows the work packet 232a built by the COMM SRC 230 with basically the buffer that was received shown as X. Proceeding to a simple queue 234, work packet 232 is queued before processing by a first application service 236 in the example. The application service 236, a parser, extracts the information from the buffer of work packet 232 and populates another area of the work packet, i.e., REQ, with the actual request data (see work packet 232b). A routing queue 238 follows. The routing queue 238 is configured to examine an attribute within work packet 232 and route the work packet based on the value assigned to that attribute. Similarly to FIG. 4, routing queue 238 is associated with an attribute "request type." As before, a SELECT request type causes routing queue 238 to route work packet 232 to a simple inbound queue 242 for a selector service 246. On the other hand, if the attribute is UPDATE, which is another type of message that "request type" could support, routing queue 238 routes work packet 232 to another simple queue (not shown) for an updater service (not shown).

Assuming the SELECT attribute, routing queue 238 routes work packet 232 to the selector service 246 for processing. Selector 246 expects a section of work packet 232 called "request" that it can use to perform its operation. Once selector service 246 performs the selection operation, work packet 232 proceeds to a forking queue 250, which puts the same work packet on multiple inbound queues connected to different application services. Along one branch, the forking queue 250 passes work packet 232 to a queue 252 leading a logger application service 254. In this example, the work packet 232 proceeds to an outbound queue 258 from logger 254 and is then trashed at a terminal sink 260.

The work packet 232 also proceeds via a queue 262 to a response formatter application service 264. As a result of going through the selection process, certain attributes are put into work packet 232, including a response field (see work packet 232c). The response formatter 264 expects a section called "response" in work packet 232 and it uses this response to output COMM OUT (see work packet 232d). COMM OUT, for instance, is the actual buffer that is input via a queue 268 to a COMM SINK 270. Thus, the request was parsed, routed, selected, and then split to permit asynchronous logging in the background.

Advantageously, the GQNF provides a dynamic structure for developing applications defined through configuration data and read at system startup (e.g., through a .ini file). The GQNF further permits an application developer to simply write code for the parser 236, selector 246, response formatter 264, and logger 254 while achieving a relatively large amount of application logic.

Those skilled in the art will appreciate that any number of services can be created and inserted into the queueing network. A kernel component administers the details of the network, which can grow arbitrarily complex as new features are added. In other words, GQNF provides dynamic application logic by adding new stages, conditional branching, and the like because each stage is a discrete unit of work. Moreover, each application service can be coded in a different language so long as the interfaces are consistent. If desired, individual stages can be made to run in parallel to remove bottlenecks.

Further to the example of FIG. 5, a future release of the server application may require additional services. The dynamic structure of the present invention permits services to be easily added. As shown in FIG. 5, a transformation service 272 is added between the parser 236 and selector 246 stages for transforming the incoming data dynamically without re-compiling. In this particular example, the Web server makes a request to a database such as a user profile store ("UPS"). The UPS then makes a request to the payload server. These two services are combined by first routing work packet 232 via a queue 274 to a UPS cache application service 276. Thus, the user profile functions are carried out without changing any of the application. An inbound queue 278 leads the transform service 272 and an outbound queue 284 follows in this example. Moreover, dynamic reconfiguration of the network makes the present invention particularly well-suited for testing applications by permitting a test function to be plugged in at any point to examine the data.

Figure 7:
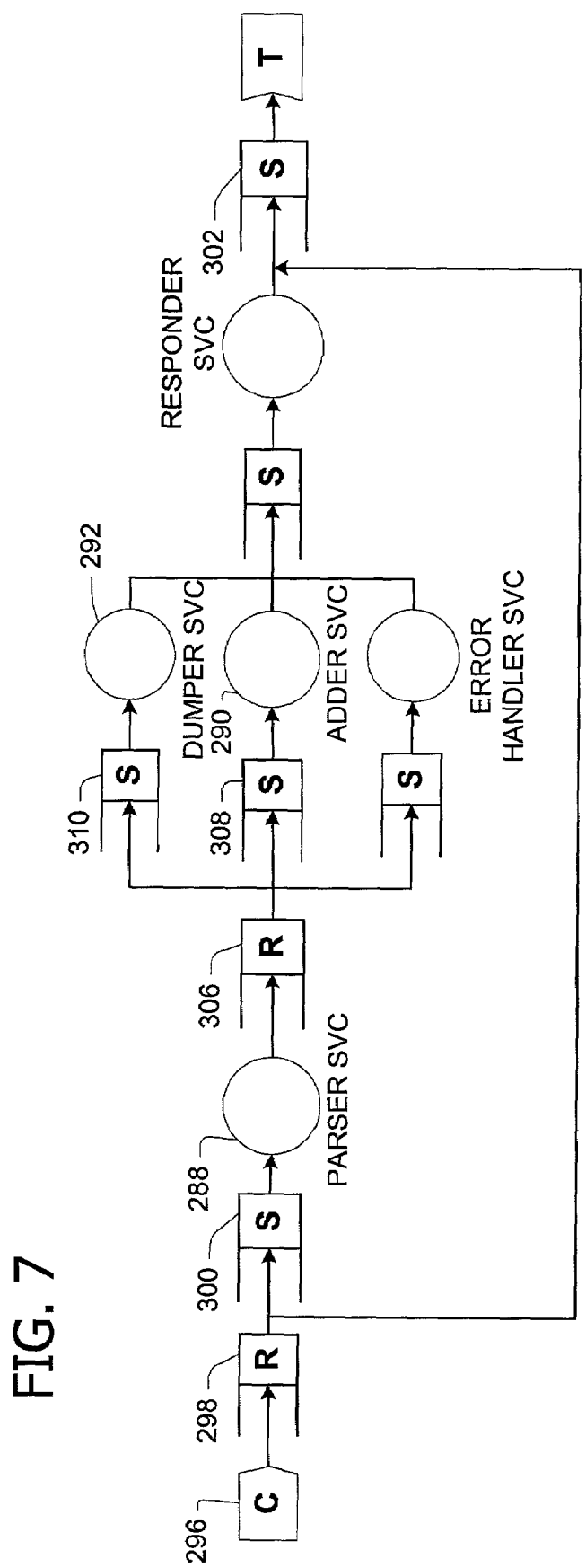
FIG. 7 is an exemplary flow diagram of another server application built on a queuing network framework according to one embodiment of the invention.

FIG. 7 illustrates yet another exemplary embodiment of the queueing network. In this example, the GQNF implements the application described above in which the server application seeks to track the number of string and character occurrences that is has been given. The framework provides essentially the same communication model but processes in "networks" of stages, instead of according to a thread pool. Among other things, FIG. 7 illustrates a parser stage 288, an adder stage 290, and a dumper stage 292. An event source 296 generates the raw request (in the form of a work packet) and a routing queue 298 passes it to a queue 300 or a queue 302 depending on its attributes. The parser 288 takes the raw request from the simple queue 300 and determines its type. Depending on the request type, a routing queue 306 directs the work packet to a queue 308 leading the adder stage 290 or a queue 310 leading the dumper stage 292. Adder stage 290 performs the string and character processing in this example and dumper stage 292 exports the data in XML.

In FIG. 7, the dumper 292 and adder 290 services are assigned to run on a single central processing unit, which provides natural serialization. Those skilled in the art will recognize a number of ways to partition the application. For instance, the primary goal may include optimizing for the lookup and reference count case. The developer may further break adder stage 290 into "lookup" and "insert" stages in this example, which permits non-blocking, delayed writes to be performed without altering the semantics of the application.

Cache-sensitive partitioning of count objects overcomes the necessity to interlock, since each CPU has a privately reserved slot. Read operations simply tally across each CPU's slot. (This is an example of optimizing for writes.) Memory pools (and heaps) can be optimized for various access patterns: same CPU (no locking), producer CPU/consumer CPU (buffered, 1/n interlocks), etc. These elements are techniques for avoiding contention for various shared resources in a multiprocessor system. Traditional systems must be extremely careful that multiple CPUs do not simultaneously access the same piece of memory. For instance, a single integer variable representing the number of times a request has been performed might be incremented by multiple threads. In order to maintain the integrity of the count, access must be serialized, which degrades performance. The GQNF imposes a structure on servers that restricts the potential access patterns for many shared data structures. This allows specialized versions of these data structures that are optimized for these access patterns to be built. In the "standard" model of building servers, access patterns are unrestricted and fairly random, and so very general (and thus slower) versions of these data structures are used. The GQNF model provides several mechanisms for eliminating these contention situations thereby increasing overall system performance.

As described above, the framework includes of several collaborating components: the queueing network kernel, node managers, nodes, and network elements (queues, event sources, event sinks, and application services). The hosted application is responsible for implementing several aspects of the system, such as an application object to handle system initialization, application services to perform the actual work of the server, and specialized event source and event sink elements. In one embodiment, global objects are maintained through a Global Object Manager, which can be used to gain access to named network elements or as a container for arbitrary application objects (also accessed by name). The interface and data-driven approach taken in the design of the GQNF allows nearly all aspects of the framework to be extended by an application, including custom queues, event sources, services, event sinks, nodes, and node managers.

APPENDIX A provides a specific example of interfaces and objects for implementing the general queueing network framework of the present invention.

One or more computer-readable media have computer-executable instructions to perform the method of the present invention.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

APPENDIX A

Interfaces and Objects

As an example, the General Queueing Network Framework (GQNF) includes the following interfaces:

IGQNFKernel: The queueing network kernel is responsible for initializing and running the system.

IGQNF Application: Implemented by the framework client, this interface will be called by the kernel to perform initialization and configuration tasks.

IGQNFNodeManager: A node manager manages a collection of nodes on a specific CPU.

There are two types of built-in node manager objects, one for each type of built-in node (see below):

Passive nodes are processed serially using a single thread of execution. Examples of passive nodes include application services and event sinks (built-in elements).

Active nodes are executed in parallel using multiple threads of execution. An example of an active node is the event source (built-in element).

Additional node managers may be implemented by the application to provide specialized functionality.

IGQNFNode: A node manages network elements (such as queues and executable components) and the relationships between them.

There are two types of built-in nodes (the built-in nodes must be properly paired with compatible node managers. It is not possible, for instance, for an active node manager to manage a passive node):

IGQNFPassiveNode: Passive nodes are scheduled for execution on a specific CPU to process a batch of work packets.

IGQNFActiveNode: Active nodes are executed once (at system startup) in their own thread of execution.

There are several built-in nodes (corresponding to the built-in network elements):

CEventSourceNode (implements IGQNFActiveNode): This node contains an event source (see IGQNFEventSource below) and an outbound queue. When this worker is executed by its node manager, it will activate the contained event source. A callback will be provided (IGQNFEventSourceEvents) for the event source to use for handing off work packets to be placed on the outbound queue.

CAppServiceNode (implements IGQNFPassiveNode): This node contains exactly one inbound queue, an application service (see IGQNFAppService below), and an outbound queue. When a worker is executed by its node manager, it will dequeue work packets from the inbound queue, hand them to the application service, then enqueue the work packet on the outbound queue when the application service returns.

CEventSinkNode (implements IGQNFPassiveNode): This node contains exactly one inbound queue and an event sink (see IGQNFEventSink below). When this worker is executed by its node manager, it will simply dequeue work packets from the inbound queue and hand them to the event sink.

Additional Nodes may be implemented by the application to provide specialized functionality.

IGQNFElement: This interface is used by the network kernel to initialize and manipulate network elements generically. All elements are required to implement this interface.

The following built-in element interfaces are provided:

IGQNFEventSource: The CEventSourceNode built-in node type requires that its executable element implement this interface. Applications will implement this interface to provide specialized work packet generation.

There following built-in event sources are implemented:

CTimerSource: Generates work packets periodically or as a one-shot.

CCommSrc IGQNFEventSource, IGQNFEventSink, IGCFServerEvents: The communication source is responsible for communicating with any compatible client. This object is implemented as GCF server application. It will take both IGCFMessage objects and IGCFRequest objects and convert them into work packets to hand to the network. Since requests must have replies, the communication source will specify itself as the dynamic event sink in the work packet. When the work packet reaches dynamic even sink in the network, the work packet will be returned the communication source object where the reply will be formatted and transmitted (new clients and protocols can be supported by creating new source objects that are able to accept the request, format a work packet, and prepare and transmit the reply).

IGQNFAppService: The CAppServiceNode built-in node type requires that its executable element implement this interface. Applications will implement this interface to process the work packets.

IGQNFEventSink: The CEventSinkNode built-in node type requires that its executable element implement this interface. Applications will implement this interface to perform final processing of a work packet.

There following built-in event sinks are implemented:

CTerminalSink: Simply decrements a work packet's reference count.

CDynamicSink: This event sink is used to invoke the sink object specified in the work packet. This mechanism is useful for allowing objects to return to the originating event source.

IGQNFQueue: Queue elements link services with other services, event source, and event sinks. Several built-in queues are provided:

CRoutingQueue: A routing queue will conditionally direct a work packet to another queue based on the value of a particular property of the work packet.

CForkingQueue: The forking queue will unconditionally send the work packet to multiple queues simultaneously, incrementing the reference count to n−1, where n is the number of outbound queues.

Additional Queues may be implemented by the application to provide specialized functionality.

IGQNFElementFactory: The element factory is used to create and configure network elements. Created object will be cached in the global object manager (see below).

IGQNFWorkPacket: A work packet contains all of the information about a specific event. Event sources generate work packets and populate them with information needed by the rest of the network. Work packets consist of hierarchical attribute/value pairs.

IGQNFGlObMgr: The global object manager is responsible for managing system-wide global objects. It can be used to access (set/get) objects by name.

What is claimed is:

1. A computer-implemented queueing system for processing messages in stages comprising:
an event source for generating work packets, each of said work packets including information relating to one of the messages to be processed;
a parser for parsing the information included in each of said work packets to determine a type of said work packets, said type including one or more attributes each corresponding to a single operation, said single operation being discrete and specific for processing each of the work packets according to the one or more attributes, said parser decomposing each of said work packets according to the attributes corresponding thereto;
a plurality of inbound queues for queueing the decomposed work packets according to the one or more attributes of the determined types of the work packets before processing, each of the plurality of inbound queues being associated with one of the attributes of the determined types of the work packets such that each individual inbound queue includes decomposed work packets corresponding to the single operation; and
a plurality of application services for processing the queued work packets, each of said application services being associated with one of the inbound queues, each of said application services defining a processing stage for executing the single operation for each of the work packets in a batch of the work packets queued therefor by the respective inbound queue, said single operation corresponding to the attribute associated with the respective inbound queue, wherein each of the plurality of application services processes the work packets serially using a single thread of execution.

2. The computer-implemented system of claim 1 further comprising a queueing network kernel component for initializing and operating the computer implemented system.

3. The computer-implemented system of claim 1 further comprising an event sink for terminating the work packets after processing by the application services.

4. The computer-implemented system of claim 3 wherein the event sink performs final processing of the work packets.

5. The computer-implemented system of claim 3 wherein the messages are requests and wherein the event source comprises a dynamic event sink to which the work packets are returned after processing by the application services for generating replies to the requests.

6. The computer-implemented system of claim 3 further comprising an inbound queue leading the event sink and wherein the event sink and the inbound queue leading the event sink define a passive node.

7. The computer-implemented system of claim 1 further comprising an outbound queue following each of the application services and wherein each of the application services and the respective inbound and outbound queues define a passive node.

8. The computer-implemented system of claim 1 further comprising an outbound queue following the event source and wherein the event source and the outbound queue following the event source define an active node.

9. The computer-implemented system of claim 1 wherein the work packets each include information relating to a message type and further comprising at least one routing queue for routing the work packets to the application services based on the message type information.

10. A computer-implemented method of processing a plurality of messages in a distributed processing system, said computer-implemented method comprising:
   generating one or more work packets, each of said work packets including information relating to one of the messages to be processed;
   parsing the information included in each of said work packets to determine a type of said work packets, said type including one or more attributes each corresponding to a single operation, said single operation being discrete and specific for processing each of the work packets according to the one or more attributes;
   decomposing each of said work packets as a function of the attributes corresponding thereto by defining a plurality of processing stages, each of said processing stages including an application service corresponding to the single operation of one of the attributes of the determined types of the work packets;
   queueing the decomposed work packets according to the attributes of the determined types of the work packets before each of the processing stages; and
   executing each of the application services in a batch of the single operation of the determined types of work packets queued for the respective processing stage, wherein each of the application services processes the work packets serially using a single thread of execution.

11. The computer-implemented method of claim 10 wherein the work packets each include information relating to a message type and further comprising routing the work packets via at least one routing queue, said routing queue routing the work packets to the processing stages based on the message type information.

12. The computer-implemented method of claim 11 wherein parsing includes parsing the work packets for the message type information, said parsing being performed by the application service at one of the processing stages.

13. The computer-implemented method of claim 11 wherein each work packet comprises a plurality of fields and further comprising populating one of the fields with the message type information.

14. The computer-implemented method of claim 10 wherein executing each of the application services includes passing the work packets from processing stage to processing stage until the messages associated with the work packets are satisfied.

15. The computer-implemented method of claim 10 wherein the messages are requests and further comprising generating responses to the messages via the processing stages.

16. The computer-implemented method of claim 10 wherein further comprising dynamically adding one or more processing stages.

17. One or more computer-readable media having computer-executable instructions for performing the method of claim 10.

18. One or more computer-readable storage media having computer-executable components for processing messages in stages comprising:
   an event source component for generating work packets, each of said work packets including information relating to one of the messages to be processed;
   a parsing component for parsing the information included in each of said work packets to determine a type of said work packets, said type including one or more attributes each corresponding to a single operation, said single operation being discrete and specific for processing each of the work packets according to the one or more attributes, said parsing component decomposing each of said work packets as a function of the attributes corresponding thereto;
   a plurality of inbound queue components for queueing the decomposed work packets according to the one or more attributes of the determined types of the work packets before processing, each of the plurality of inbound queue components being associated with one of the attributes of the determined types of the work packets such that the decomposed work packets are processed according to the single operation; and
   a plurality of application service components for processing the queued work packets, each of said application service components being associated with one of the inbound queue components, each of said application service components defining a processing stage for executing the single operation for each of the work packets in a batch of the work packets queued therefor by the respective inbound queue component, said single operation corresponding to the attribute associated with the respective inbound queue, wherein the plurality of application service components process the work packets serially each using a single thread of execution.

19. The computer-readable storage media of claim 18 further comprising a queueing network kernel component for initializing and operating the event source, application service, and inbound queue components.

20. The computer-readable storage media of claim 18 further comprising an event sink component for terminating the work packets after processing by the application service components.

21. The computer-readable storage media of claim 20 wherein the event sink component performs final processing of the work packets.

22. The computer-readable storage media of claim 20 wherein the messages are requests and wherein the event source component comprises a dynamic event sink component to which the work packets are returned after processing by the application service components for generating replies to the requests.

23. The computer-readable storage media of claim 20 further comprising an inbound queue component leading the event sink component and wherein the event sink component and the inbound queue component leading the event sink component define a passive node.

24. The computer-readable storage media of claim 18 further comprising an outbound queue component following each of the application service components and wherein each of the application service components and the respective inbound and outbound queue components define a passive node.

25. The computer-readable storage media of claim 18 further comprising an outbound queue component following the event source component and wherein the event source component and the outbound queue component following the event source component define an active node.

26. The computer-readable storage media of claim 18 wherein the work packets each include information relating to a message type and further comprising at least one routing queue component for routing the work packets to the application service components based on the message type information.

27. The computer-readable storage media of claim 26 wherein at least one of the application service components comprises a parser service for parsing the work packets for the message type information.

28. The computer-readable storage media of claim 26 wherein each work packet comprises a plurality of fields and wherein at least one of the application service components populates one of the fields with the message type information.

29. A computer-implemented method of developing server applications for use in a multi-processor environment comprising:

defining a plurality of processing stages for processing a plurality of requests, each of said processing stages including a dedicated application service, each of said application services having a single thread of execution, said single thread of execution of each dedicated application service being discrete and specific for processing the plurality of requests in each of the plurality of processing stages;

generating one or more work packets, each of said work packets including information relating to one of the requests to be processed;

parsing the information included in each of said work packets to determine a type of said work packets, said type including one or more attributes each corresponding to the single thread of execution;

decomposing each of said work packets according to the attributes corresponding thereto;

providing queues before each of the processing stages for queueing the decomposed work packets according to one of the attributes of the determined types of the work packets, each of the queues indicating one of the attributes of the determined types of the work packets, each of said application services being executed in a batch of the work packets queued for the respective processing stage corresponding to one of the attributes such that each individual queue includes decomposed work packets to be processed serially according to the single thread of execution; and routing the work packets through the processing stages until the requests are satisfied.

30. The computer-implemented method of claim 29 wherein the work packets each include information relating to a request type and further comprising providing at least one routing queue for routing the work packets to the processing stages based on the request type information.

31. The computer-implemented method of claim 30 wherein at least one of the application services is a parser for parsing the work packets to determine the request type information.

32. The computer-implemented method of claim 31 wherein each work packet comprises a plurality of fields and wherein the parser populates one of the fields with the request type information.

* * * * *